United States Patent
Cohen

[11] 4,162,122
[45] Jul. 24, 1979

[54] ZONAL BIFOCAL CONTACT LENS

[76] Inventor: Allen L. Cohen, 5795 Stevens Forest Rd., Columbia, Md. 21045

[21] Appl. No.: 833,368

[22] Filed: Sep. 14, 1977

[51] Int. Cl.² ........................... G02B 3/08; G02B 3/10; G02C 7/04
[52] U.S. Cl. ..................................... 351/161; 350/211
[58] Field of Search ................. 351/160, 161; 350/211

[56] References Cited

U.S. PATENT DOCUMENTS

| | | | |
|---|---|---|---|
| 2,077,092 | 4/1937 | Broder | 350/211 |
| 3,004,470 | 10/1961 | Ruhle | 350/211 |

FOREIGN PATENT DOCUMENTS 1154360  6/1969  United Kingdom ...................... 350/211

OTHER PUBLICATIONS

Ziegler, J. F., "Fabrication or Correction of Optical Lenses", *IBM Technical Disclosure Bulletin,* vol. 12, No. 10, Mar. 1970, pp. 1573-1575.

*Primary Examiner*—John K. Corbin
*Assistant Examiner*—Scott J. Sugarman

[57] ABSTRACT

A multifocal lens design suitable for use as an opthalmic contact lens. A zonal bifocal contact lens utilizes the multifocal Fresnel lens designs which have their multifocal property distributed approximately throughout the lens. This is accomplished by a lens construction in which the optical facets are interfaced without any non-refractive ledges or steps occurring between adjacent facets.

1 Claim, 3 Drawing Figures

ZONAL BIFOCAL CONTACT LENS

BACKGROUND OF THE INVENTION

This invention relates to contact lenses and, more particularly, to contact lenses having bifocal characteristics.

Bifocal contact lenses have previously been produced. Such lenses generally follow the design of bifocal lenses employed in conventional eye glasses in that the lenses usually restrict the two focal powers to separate localized areas within the lens. The major problem inherent in these designs, is the difficulty encountered when the wearer tries to shift his eye position between the distance viewing portion of the lens and the near viewing portion of the lens. In order for this to be accomplished, the lens must be stabilized in such a manner as to allow the eye to move relative to the contact lens in a reasonably precise fashion. This has proved to be very difficult.

The present invention investigates a different approach to the design of a bifocal contact lens. It considers the construction of a bifocal contact lens such that every region of the lens will exhibit the bifocal property. Multiple focal power lenses are known. They consist of plurality of annular rings, the surfaces of which have the same inclinations to the optical axis, in a repetitive alternating pattern, as the individual surfaces of the single focal power lenses they wish to combine.

In the past, these multiple focal power lenses have always been of a stepped Fresnel lens form. That is, one or another of the lens surfaces presents itself as a discontinuous saw-toothed surface. This has allowed for keeping lens thickness small. In camera lenses and in regular spectacle lenses this is an advantage and poses no great problems.

However, if such a surface form were used to construct a bifocal contact lens, the troughs between the annular steps would fill with tears and completely destroy the optics of the contact lens. This can be easily seen with reference to FIG. 2 where we see a cross-sectional view of a stepped Fresnel lens with a tear layer, illustrated by a broken line, adhering to the stepped surface. In cameras and spectacles where the lenses are fairly large, it is often crucial to keep lens thickness small, and that is precisely the point of a stepped Fresnel lens. But to accomplish this, adjacent annular zones A must be separated discontinuously from each other by annular facets I which are parallel to the optical axis so as not to form part of the refractive surface. This construction forms the steps or echelons of a Fresnel lens. However, in the case of a contact lens the refractive surface is actually formed by the tear layer adhering to the anterior lens surface. As shown in FIG. 2, the tears tend to smooth out the discontinuous saw-toothed surface and thereby bring the annular facets I into an inclination which will destroy the quality of the new refractive surface formed by the tear layer.

SUMMARY OF THE INVENTION

The present invention is summarized in a contact lens with a concave spherical or aspherical posterior surface and a continuous anterior surface which is divided into concentric annular rings. Further, the individual annular rings must present, altenatingly, an inclination to the optical axis corresponding to the curvatures appropriate to the distance and near focal powers. Finally, the interfacing of the adjacent annular rings must be continuous so as not to present any steps or jumps upon the anterior surface of the contact lens.

In view of the foregoing, it is an object of the present invention, to design in a simple manner, a bifocal contact lens so as to have the bifocal property distributed approximately over the whole optic surface in such a way as to retain this property when on the eye and in the presence of the normal tear layer of the eye.

DESCRIPTION OF THE PREFERRED EMBODIMENTS

Figure 1:
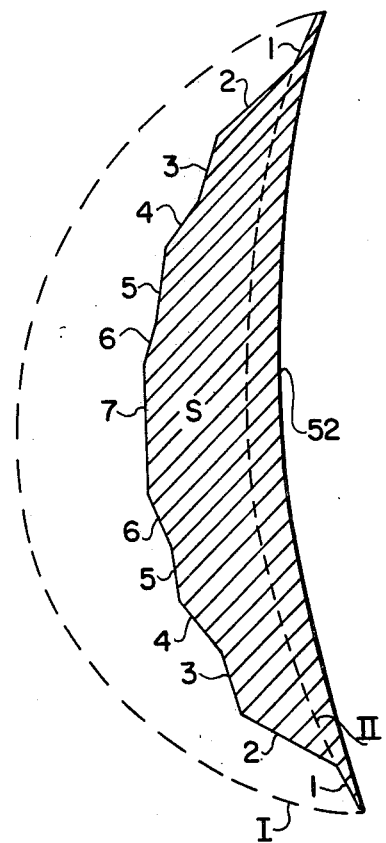
FIG. 1 shows a cross-sectional view of a zonal bifocal contact lens in accordance with the invention, together with two curves I and II corresponding to two different focal powers.

Referring to FIG. 1, the zonal bifocal contact lens S is used to provide two focal powers corresponding to two individual lenses having curvatures as illustrated by the broken lines I and II. By way of example the anterior surface S1 of the contact lens is subdivided into seven concentric annular zones. The first zone 1 has an inclined surface, the inclination of which relative to the optical axis corresponds, for instance to the inclination of the line II at the same distance from the optical axis as said zone 1. The inclination of the zone 2 corresponds to the inclination of the line I at the same distance from the optical axis as said zone 2. The following zones receive alternatingly inclinations corresponding to the respective broken lines I and II at the same distance from the optical axis as the respective zone. Thus a single zoned lens is produced which will exhibit the property of having two different focal powers at least approximately over the whole optic surface of the contact lens.

Figure 2:
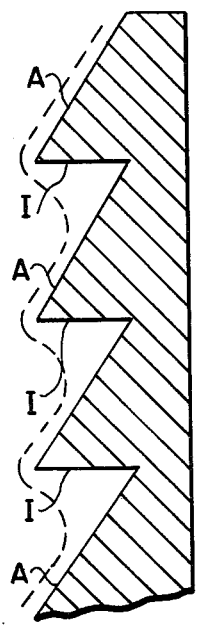
FIG. 2 shows a cross-sectional view of a portion of a stepped Fresnel lens, together with a tear layer, illustrated by a broken line, adhering to the stepped Fresnel surface.

Furthermore, whereas in a stepped Fresnel lens, such as in FIG. 2, each zone consists of two facets, one facet A being a refractive element of the lens and the other facet I being a non-refractive element of the lens, in a zonal bifocal as previously described, each zone consists of a refractive element only. Thus the anterior surface of the zonal bifocal contact lens consists of refractive facets only, which together form a continuous surface and will thereby provide the bifocal characteristic in the presence of the normal tear layer of the eye.

Figure 3:
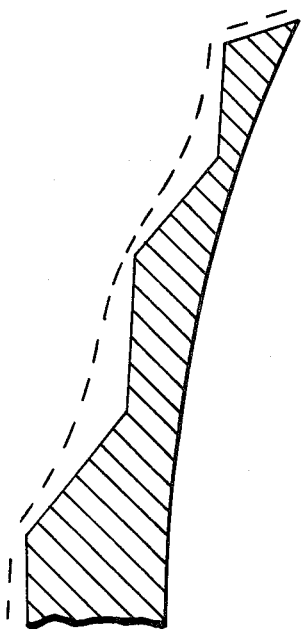
FIG. 3 shows a cross-sectional view of a portion of a zonal bifocal contact lens in accordance with the invention, together with a tear layer, illustrated by a broken line, adhering to the anterior surface of the lens.

As a further refinement the inclinations of the annular zones may be adjusted to compensate for the effects of the tear layer. FIG. 3 shows a cross-sectional view of a portion of a zonal bifocal contact lens with a tear layer, illustrated by a broken line, adhering to the anterior zoned surface. It is clear that the tear layer has the effect of reducing the depth of the troughs between adjacent annular zones. This can be compensated for, by providing the annular zones with inclinations adjusted to give slightly deeper troughs between the adjacent zones than would occur by matching the inclinations of the broken lines I and II exactly. These inclinations should be adjusted in such a manner so that the tear layer surface itself matches the broken lines I and II as closely as possible.

While the invention has been described and illustrated in one particular embodiment, it is not to be considered limited to the details disclosed, since many modifications can be made without departing in any way from the spirit and concept of the invention.

What is claimed is new and desired to be protected by Letters Patent is:

1. A zonal bifocal contact lens which is designed with a concave-convex shape, with the posterior concave surface being adapted to adhere to and float on the cornea, the anterior convex surface being divided into annular zones, the individual zones presenting alternatingly, inclinations to the optical axis of the contact lens, corresponding approximately to the curvatures of a distance and near correction focal power, adjacent annular zones interfaced continuously so as not to present any steps or jumps upon the anterior surface of the contact lens wherein the inclinations of the annular zones have been adjusted to give slightly deeper troughs between the adjacent zones than would occur in matching the distance and near curvatures exactly, and adjusted in particular, so that an overlying tear layer would itself form a surface matching, in the corresponding zones, the distance and near curvatures as closely as possible.

* * * * *